(12) United States Patent
Madan et al.

(10) Patent No.: US 6,294,248 B1
(45) Date of Patent: *Sep. 25, 2001

(54) SOFT MOLDED COMPOSITES AND A PROCESS FOR THEIR PRODUCTION

(75) Inventors: Sanjeev Madan, Coraopolis; James R. Jasenak, Sewickley; David L. Fair, Imperial, all of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/313,488

(22) Filed: Sep. 27, 1994

(51) Int. Cl.[7] ............................................ B29C 44/06
(52) U.S. Cl. .................. 428/318.6; 264/46.4; 264/46.6; 264/255; 264/309; 428/319.3
(58) Field of Search ................. 264/46.6, 46.4, 264/255, 309; 428/318.6, 319.3

(56) References Cited

U.S. PATENT DOCUMENTS

| 4,190,697 | * | 2/1980 | Ahrens | 264/46.6 |
| 4,294,880 | * | 10/1981 | Nishida | 264/46.6 |
| 5,116,557 | * | 5/1992 | Debaes et al. | 264/46.6 |
| 5,223,193 | * | 6/1993 | Bianchin et al. | 264/46.6 |

\* cited by examiner

Primary Examiner—Allan R. Kuhns
(74) Attorney, Agent, or Firm—Joseph C. Gil; Lyndanne M. Whalen

(57) ABSTRACT

Molded, soft composite articles such as seat cushions are made by (a) applying a composition which forms a soft elastomer to all interior walls of an open mold, (b) introducing a composition which will react to form a low density, high resiliency, flexible foam under molding conditions into the mold in a manner such that the foam-forming composition will be substantially completely within the elastomer-forming composition; (c) closing the mold (i) prior to introduction of the foam-forming composition or (ii) at some point during or subsequent to introduction of the foam-forming mixture but before foam formation is completed and (d) allowing the foam-forming mixture to form a foam. The composite articles produced by this simple one-step process are characterized by good cushioning characteristics, good abrasion resistance and good mold reproducibility. This molding process generates less waste and requires less labor and equipment than current commercial processes.

20 Claims, 1 Drawing Sheet

SOFT MOLDED COMPOSITES AND A PROCESS FOR THEIR PRODUCTION

BACKGROUND OF THE INVENTION

The present invention relates to soft molded composites such as seat cushions, particularly polyurethane and polyurethane/polyurea composites, and to a one-step process for the production of these composites.

Soft composite materials are used in seating applications, exercise equipment pads, support pads in spas and jacuzzis, etc. These composite materials are typically made from a foam which is subsequently covered with a flexible material such as vinyl or fabric.

Processes for the production of flexible foams covered with a soft material such as vinyl are known. In these known processes, the foam is generally molded into the desired form and then covered with a flexible membrane or a material such as vinyl or fabric. In addition to equipment for molding the foam, such processes also require equipment or significant manual labor to cover the foam. The foam covering operation is separate from the molding operation. These two separate operations increase the cycle time and effort necessary to produce the final composite article. Waste is generated in these processes due to inadequate coating, damaged foam, "fitting" the covering to the foam, etc. This waste has a significant effect upon the economy of the production process.

SUMMARY OF THE INVENTION

It is an object of the present invention to provide novel soft molded composites, particularly polyurethane and polyurethane/urea composites.

It is also an object of the present invention to provide soft molded polyurethane and polyurethane/urea composites having complex shapes.

It is another object of the present invention to provide a one-step process for molding soft polyurethane and polyurethane/urea composites.

It is a further object of the present invention to provide a process for the production of molded soft polyurethane/urea composites in which cycle time and waste are substantially reduced.

It is also an object of the present invention to provide a process for the production of molded soft composite polyurethane and polyurethane/urea composites characterized by improved foam/elastomer adhesion with reduced sag.

It is a further object of the present invention to provide a process for building a seam in a composite article in which a foam-forming mixture acts as an adhesive bonding layer between two soft-elastomeric layers.

These and other objects which will be apparent to those skilled in the art are accomplished by (1) applying (preferably by spraying) a composition which forms a soft, elastomeric layer after application to all of the interior walls of an open mold; (2) closing the mold; (3) introducing a composition which will form a low density, high resiliency, flexible foam under molding conditions to the mold in a manner such that the foam-forming composition will be substantially completely within the elastomer-forming composition; and (4) allowing the foam-forming composition introduced in (3) to complete foam formation. The foam-forming mixture may be introduced into the mold before the mold is closed but the mold must be closed prior to completion of foam formation. The resultant molded, composite article may then be removed from the mold. As can be seen from FIGS. 1 and 2, the foam-forming composition may act as an adhesive which bonds the "upper" and "lower" elastomeric layers present on the mold walls.

DETAILED DESCRIPTION OF THE INVENTION

Figure 1:
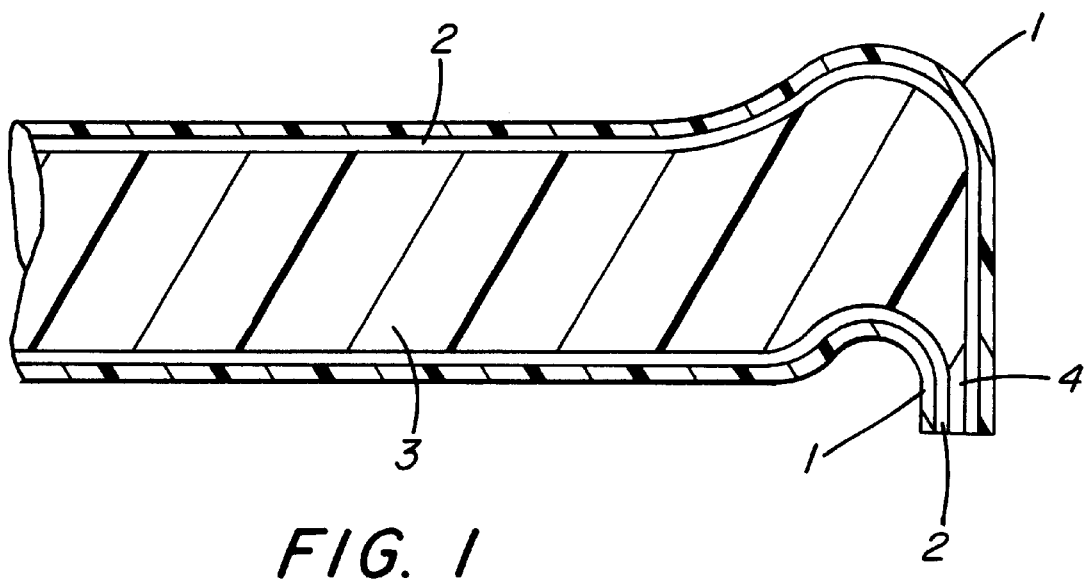
FIGS. 1 and 2 are cross-sectional views of soft composites made in accordance with the present invention. These cross-sectional views illustrate the seam between the upper and lower elastomeric layers and the adhesive bonding of these layers by means of the foam-forming mixture.

The present invention relates to molded, soft composite articles such as seat cushions and to a one-step process for the production of these composites.

In the process of the present invention, the interior walls of the mold in which the composite material is to be produced are completely covered with a composition which forms a soft elastomer (preferably a polyurethane or polyurethane/urea elastomer) shortly (i.e., within from about 15 to about 120 seconds, preferably within from about 15 to about 45 seconds) after it has been applied to the mold wall. A composition which forms a foam under the molding conditions is introduced into the mold which has walls treated with elastomer-forming material. The foam-forming composition must be introduced in a manner such that it is substantially completely within the elastomer "coating" of the mold walls. It is preferred that the mold be securely closed prior to introduction of the foam-forming composition but it is also possible to pour the foam-forming composition into the open mold. When the foam-forming composition is introduced into an open mold, the mold must, however, be closed prior to completion of the foam formation. Upon substantial completion of the foam formation, the molded composite article is removed from the mold.

Any of the commercially available molds into which foamable materials may be introduced after the mold has been closed may be used in the practice of the present invention. The walls of the mold may, of course, be treated with a material that promotes release of a molded article from the mold (i.e., a mold release agent) prior to application of the elastomer-forming (preferably, polyurethanelpolyurea elastomer-forming) composition. Any of the commercially available solvent-based or water-based mold release agents may be used. Examples of suitable commercially available mold release agents include ChemTrend PRC-778, ChemTrend MR-515, ChemTrend RCTW-1151, ChemTrend RCTW-9011 and Chemlease 81W.

The elastomeric composition which is applied to the mold walls may be applied by techniques such as spraying or reaction injection molding. Spraying is the preferred technique, particularly where the mold being used is for complex and intricate articles, because easy, even coverage of the mold wall is achieved. Either high pressure (i.e., 800–2,000 psi) or low pressure (i.e., 50–200 psi) metering units with static, impingement or dynamic mixing capability may be used to spray the elastomeric composition to the mold walls.

The elastomer-forming composition is generally applied to the mold walls in an amount such that the elastomer layer which forms is at least about 30 mils (i.e., at least about 0.030 inches) thick, preferably at least about 40 mils (i.e., at least about 0.040 inches) thick. These thicknesses are used in order to achieve at least the minimum desired abrasion characteristics and to avoid bleed through of the foam.

This elastomer-forming composition may be any material, preferably a polyurethane/polyurea material, which has (1) a sufficiently fast viscosity buildup or thixotropic effect that dripping and sagging are kept to a minimum and (2) a gel time such that bonding with the foam is achieved. Gel time is defined as the time it takes the reactive material to form a viscous gel such that no further visually observable flow occurs. The gel time is the amount of time which elapses between combination of the reactants and the point when no material is transferred onto an applicator stick when that stick is touched to the reaction product.

Polyurethane and polyurethane/urea forming compositions are preferred elastomer compositions because in addition to these two required characteristics (i.e., gel time and fast viscosity buildup), they improve the flammability, electrical and physical properties of the elastomeric coating of the molded article. Particularly preferred polyurethane and polyurethane/urea elastomers are those which are soft (i.e., have a Shore A value of less than 90) and flexible (i.e., elongation >50%, preferably >80%, most preferably >100%) because composites having such elastomeric coatings may be more readily demolded and recover their shape.

Suitable elastomer-forming compositions include a polyisocyanate and at least one isocyanate-reactive material having at least two isocyanate reactive groups, preferably from about 2 to about 4 isocyanate reactive groups, and a molecular weight of at least 60, preferably from about 200 to about 8000.

Any of the known isocyanates may be used in the practice of the present invention to produce polyurethane and/or polyurea elastomers. Suitable isocyanates which may be used include aromatic, aliphatic, cycloaliphatic polyisocyanates and combinations thereof. Specific examples of suitable isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,4-cyclohexane diisocyanate, hexahydrotoluene diisocyanate and its isomers, 1,5-naphthylene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate, and 3,3'-dimethyl-diphenylpropane-4,4'-diisocyanate; triisocyanates such as 2,4,6-toluene triisocyanate; and polyisocyanates such as 4,4'-dimethyl-diphenylmethane-2,2',5,5'-tetraisocyanate and the poly-methylene polyphenylisocyanates.

Crude polyisocyanates may also be used in the practice of the present invention. The crude toluene diisocyanate obtained by phosgenating a mixture of toluene diamines and the crude diphenylmethane diisocyanate obtained by phosgenating crude diphenylmethanediamine are examples of suitable crude polyisocyanates. Suitable undistilled or crude polyisocyanates are disclosed in U.S. Pat. No. 3,215,652.

Isocyanate-terminated prepolymers having an NCO content of at least about 8%, preferably from about 9 to about 30%, may be used to produce the elastomer-forming compositions of the present invention. Prepolymers of diphenylmethane diisocyanate having NCO contents of from about 8 to about 17%, preferably about 10%, by weight, are particularly preferred. These preferred prepolymers are made by pre-reacting diphenylmethane diisocyanate (MDI) or an isomer mixture of MDI with an isocyanate-reactive compound such as a polyol or polyamine having a functionality of from about 1.9 to about 3.1, preferably about 2 in an amount such that the unreacted isocyanate group content is within the above-specified range.

The isocyanate or isocyanate-terminated prepolymer may be reacted with any of the isocyanate-reactive compounds, particularly, polyols or polyamines, which are known to be useful in the production of polyurethane/polyurea elastomers. Suitable polyols include polyether polyols, polyester polyols, polyacetals, polycarbonates, polyester ethers, polythioethers, polyamides, polybutadienes and polylactones having a molecular weight of from about 400 to about 10,000 (preferably from about 1,000 to about 8,000) and a functionality of at least about two, preferably from about 2 to about 4. Polyether polyols are preferred. Mixtures of polyether polyols in which from about 20 to about 55% by weight, preferably from about 40 to about 45% by weight, is a difunctional polyether polyol and from about 30 to about 70% by weight, preferably from about 45 to about 65% by weight, is a trifunctional or higher functional polyether polyol are particularly preferred for the production of the elastomer-forming composition.

A thixotropic agent which builds up the viscosity of the reactive mixture upon mixing is generally included in the isocyanate-reactive materials used. Any of the known thixotropic agents may be used but organic amines, particularly aromatic and aliphatic diamines having molecular weights of from about 60 to about 2,000 (preferably from about 100 to about 400) are preferred. Any of the known catalysts, surfactants, crosslinking agents and additives may also be included in the elastomer-forming mixture.

The isocyanate and isocyanate-reactive material are used in amounts such that the equivalent ratio of isocyanate groups to isocyanate-reactive groups is from about 0.9:1 to about 1.2:1.0, preferably from about 0.95:1.0 to about 1.1:1.0, most preferably about 1.05:1.

Additives useful in the production of the elastomer-forming composition include: antioxidants, pigments, light stabilizers, heat stabilizers, UV stabilizers, crosslinking agents, moisture scavengers, defoamers, acid scavengers, inorganic fillers and organic fillers.

A reaction promoter or catalyst may be included in the elastomer-forming composition to ensure that the elastomeric layer which forms on the mold walls is sufficiently set prior to introduction of the foam-forming mixture. Preferred catalysts include amines (particularly tertiary amines) and organo-metallic compounds of metals such as tin, bismuth and zinc.

It is advantageous that the elastomer-forming composition have a gel time of from about 15 seconds to about 120 seconds, preferably from about 15 to about 75 seconds, most preferably from about 30 to about 50 seconds to ensure that the elastomeric coating which forms on the mold wall is sufficiently set that the foam-forming mixture will be substantially completely contained within that elastomeric coating.

The foam-forming mixture may be introduced into the dosed mold by any of the known techniques such as pouring or injection. It is preferred, however, that the foam-forming mixture be injected into the mold with high or low pressure metering units.

The foam forming mixture should be selected so that the product foam will have a density of from about 1.8 to about 4.5 pounds per cubic foot (from about 0.028 to about 0.075 $gm/cm^3$), preferably from about 2.4 to about 3.6 pounds per cubic foot (from about 0.038 to about 0.057 $gm/cm^3$). It is preferred that the foam have high recovery (i.e., a recovery of at least 60%, as determined by ASTM D 3574), a sag factor of at least 2.5, preferably from about 2.5 to about 3.9 (as determined by ASTM D 3574 B1) and no yield point on the stress-strain tensile curve.

Suitable foam-forming mixtures may be made by combining a diisocyanate, a polyisocyanate and or a modified isocyanate such as an isocyanate-terminated prepolymer with a polyisocyanate-reactive compound having a functionality of at least about two, preferably from about 2 to about 4, in quantities such that the equivalent ratio of isocyanate to isocyanate-reactive groups is from about 0.8:1.0 to about 1.2:1.0, preferably about 1:1.

Any of the known diisocyanates, polyisocyanates, modified polyisocyanates (particularly, isocyanate-terminated prepolymers) and mixtures thereof may be used to produce the foam-forming mixture of the present invention. Specific examples of suitable isocyanates include those listed above as being suitable for the production of the polyurethane and/or polyurea elastomer. Mixtures of polyisocyanates, diisocyanates and modified polyisocyanates based on MDI and its isomers are preferred. Mixtures of diphenylmethane diisocyanates and/or polyisocyanates having an NCO content of from about 32.0 to about 32.8 are among the most preferred isocyanates.

Modified polyisocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing isocyanate groups and having an isocyanate group content of from about 25 to about 42% by weight, preferably from about 28 to about 32% by weight, particularly those based on polyether polyols or polyester polyols and diphenylmethane diisocyanate. Processes for producing these modified polyisocyanates are known in the art.

Any of the known isocyanate-reactive compounds having a molecular weight of at least about 400, preferably from about 1,000 to about 8,000, most preferably from about 2,000 to about 6,500 may be used to produce the foam-forming mixture of the present invention. Polyether polyols and mixtures of polyether polyols having an average functionality which is greater than or equal to 2 are particularly preferred.

Any of the known blowing agents, catalysts, chain extenders, crosslinking agents, auxiliaries and additives may also be included in the foam-forming mixture. It is preferred that water, an HCFC, a hydrocarbon or mixtures of these known blowing agents be used as the blowing agent. An amine-based catalyst and/or a tin-based catalyst is preferably included in the foam-forming mixtures in an amount such that the foam formation takes place within a reasonable amount of time.

Optional additives and auxiliaries which may be useful in the foam-forming compositions of the present invention include: cell openers such as polyether polyols based on sorbitol; surfactants, particularly silicone surfactants; crosslinking agents such as aliphatic amines and aromatic amines; antioxidants; UV stabilizers; and flame retardants such as melamine.

The composite molded articles produced in accordance with the present invention may be removed from the mold after about 3 to about 10 minutes, preferably after from about 4 to about 5 minutes.

These composite molded articles are characterized by good cushioning characteristics, good abrasion resistance, a dense flexible outer elastomer, good tear resistance and good mold reproducibility.

Having thus described our invention, the following Examples are given as being illustrative thereof. All parts and percentages given in these Examples are parts by weight and percentages by weight, unless otherwise indicated.

EXAMPLES

The following materials were used in the Examples:

POLYISOCYANATE A: A prepolymer of MDI having an NCO content of 10% which is commercially available from Miles Inc. under the name Mondur E-1437.

POLYISOCYANATE B: MDI having an NCO content of 32.8% which is commercially available from Miles Inc. under the name Mondur MRS-20.

POLYISOCYANATE C: A mixture of polyisocyanates made up of 90% polymeric MDI which is commercially available from Miles Inc. under the name Mondur MRS-2 and 10% monomeric MDI which is commercially available under the name Mondur ML which mixture has an NCO content of 32.5%.

POLYOL A: A polyether polyol having a molecular weight of 6000 and a functionality of 3.0 which is commercially available from Miles Inc. under the name Multranol 3901.

POLYOL B: A polyether polyol having a molecular weight of 3400 and a functionality of 6.0 which is commercially available from Miles Inc. under the name Multranol E-9185.

POLYOL C: A polyether polyol having a molecular weight of 4800 and a functionality of 3.0 which is commercially available from Miles Inc. under the name Multranol E-9143.

POLYOL D: A polyether polyol having a molecular weight of 4,000 and a functionality of 2 which is commercially available from Miles Inc. under the name Multranol E-9111.

POLYOL E: A polyether polyol having a molecular weight of 6,000 and a functionality of 3.0 which is commercially available from Miles Inc. under the name Multranol E-9139.

CATALYST A: An amine catalyst which is commercially available from OSI Specialties under the name Niax A-1.

CATALYST B: An amine catalyst which is commercially available from OSI Specialties under the name Niax A-4.

CATALYST C: An amine catalyst which is commercially available from Air Products under the name Dabco 33-LV.

CROSSLINKING AGENT: Dytek A which is commercially available from DuPont.

CHAIN EXTENDER: DETDA (diethylenetoluene diamine) which is commercially available from Air Products.

Example 1

The interior walls of a seat mold made of epoxy coated with aluminum paint were coated with the mold release agent which is commercially available under the name Chemtrend RCTW 9011. The mold was then preheated to 100° F. before spraying the internal walls with an elastomer-forming composition using a high pressure spray machine with a static mixer. The elastomer-forming composition was made up of the following:

45 parts by weight of POLYOL C
45 parts by weight of POLYOL D
10 parts by weight of CHAIN EXTENDER
0.2 parts by weight CATALYST C and
75 parts by weight of POLYISOCYANATE A This composition was sprayed in an amount such that the composition was present in a thickness of from about 40 to about 60 mils. The elastomer layer coating the mold walls set within approximately 30 seconds.

The mold was then closed. A foam-forming composition made up of 100 parts by weight of POLYOL A
    2.0 parts by weight of POLYOL B
    0.5 parts by weight of a commercial silicone surfactant
    0.25 parts by weight of CATALYST A
    0.45 parts by weight of CATALYST B
    0.2 parts by weight of CATALYST C
    0.5 parts by weight of CROSSLINKING AGENT
    3.0 parts by weight of water and
    50 parts by weight of POLYISOCYANATE B was then injected into the mold with a high pressure machine in a manner such that all of the foam-forming mixture was within the previously formed elastomer coating. The time of injection of foam-forming mixture was controlled so that the heat generated during the elastomer "coating" formation was from about 110 to about 145° F. The foam was sufficiently set within three minutes that the molded composite could be removed from the mold.

The physical properties of the composite article were as follows:

Elastomer Coating

| | |
|---|---|
| Isocyanate Index | 105 |
| Density (lbs/ft$^3$) | 60 |
| Tensile Strength, psi (ASTM D 412) | 900 |
| % Elongation (ASTM D 412) | 500 |
| Tear Strength, Die C, lbf/in (ASTM D 624) | 190 |
| Split Tear, lbf/in (ASTM D 1938) | 80 |
| Hardness, Shore A | 65 |
| Taber Abrasion, mg loss/cycle (ASTM D 460) | 0.35 |

Molded Foam: (All sample tests done in accordance with ASTM D 3574)

| | |
|---|---|
| Isocyanate Index | 100 |
| Core Density, lbs./ft$^3$ | 2.75 |
| Molded Density, lbs./ft$^3$ | 3.0 |
| Tensile Strength, psi | 15.0 |
| % Elongation | 100 |
| Tear Strength, lbf/in | 1.0 |
| 50% Compression Set | 7.5% |
| 25% ILD*, lbs | 37 |
| 65% ILD*, lbs | 98 |
| Sag Factor | 2.65 |
| Hysteresis | 18.5 |
| % Recovery | >70 |

*ILD means Indentation Load Deflection

Example 2

Example 1 was repeated with the exception that the following foam-forming forming mixture was used:

46 parts by weight of POLYOL A
    46 parts by weight of POLYOL E
    0.14 parts by weight of CATALYST A
    0.25 parts by weight of CATALYST C
    0.9 parts by weight of a commercial silicone surfactant
    2.25 parts by weight of water and
    45 parts by weight of POLYISOCYANATE C.

The properties of the resultant composite article were comparable to those of the composite produced in Example 1.

Example 3

Example 1 was repeated using the same elastomer-forming and foam-forming compositions to produce a composite article in a mold having the shape shown in FIG. 1. The mold walls 1 were coated with the elastomer-forming composition. The elastomer layers 2 which formed each had a thickness of from about 0.03 to about 0.07 inches. The mold was closed and the foam-forming mixture was introduced into the mold and allowed to foam in a manner such that foam 3 and foam seam 4 were formed. Foam seam 4 acted as a bonding layer at the seam between elastomer layers 2. The resultant composite molded article had a foam line or seam 4 which was from about 0.001 to about 0.05 inches thick.

Example 4

Figure 2:
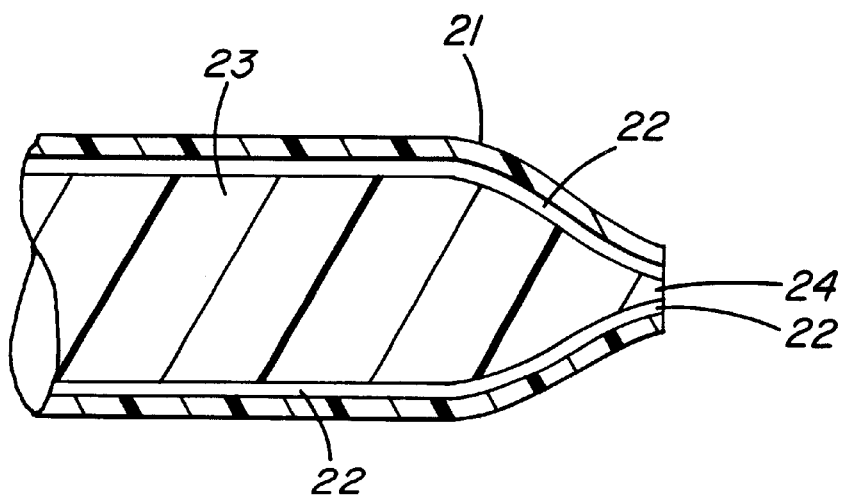

Example 1 was repeated using the same elastomer-forming and foam-forming compositions to produce a composite article in a mold having the shape shown in FIG. 2. The mold walls 21 were coated with the elastomer-forming composition. The elastomer layers 22 which formed each had a thickness of from about 0.03 to about 0.07 inches. The foam-forming composition was then introduced into the closed mold and allowed to foam in a manner such that foam 23 and foam seam 24 were formed. Foam seam 24 acted as a bonding layer between the elastomer layers 22. The resultant composite molded article had a foam line or seam 24 which was from about 0.001 to about 0.05 inches thick.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a soft composite in a closed mold comprising:

a) applying a composition which forms a soft elastomer that includes a prepolymer of diphenylmethane diisocyanate having an NCO content of from about 8 to about 17% by weight and at least one isocyanate-reactive compound with at least two isocyanate-reactive groups to the interior walls of the open mold;

b) introducing a composition which is made up of
        1) a mixture of diphenylmethane diisocyanates and/or polyisocyanates having an NCO content of from about 32.0 to about 32.8 which isocyanates are not prepolymers,
        2) a polyol mixture having a functionality of at least two and molecular weight of from about 400 to about 8,000,
        3) a blowing agent,
        4) an amine catalyst, and
        5) an amine crosslinking agent and will react to form a low density, high resiliency, flexible foam under molding conditions in an amount such that the formed foam will fill the mold into the mold in a manner such that this composition will be substantially completely within the elastomer-forming composition present on the mold walls;

c) closing the mold and d) allowing the composition introduced in b) to form a foam.

2. The process of claim 1 in which the composition applied in a) is a polyurethane and/or polyurea elastomer-forming composition.

3. The process of claim 1 in which the elastomer-forming composition is sprayed to the mold walls to a thickness of at least 30 mils.

4. The process of claim 1 in which the composition applied in a) forms an elastomer within from about 15 to about 120 seconds of application to the mold wall.

5. The process of claim 1 in which the composition applied in a) is made up of 1) a prepolymer of diphenylmethane diisocyanate having an NCO content of from about 8 to about 17%;

2) at least one polyol having a functionality of at least about two and a molecular weight of from about 400 to about 10,000;

3) an amine thixotropic agent; and 4) a catalyst.

6. The process of claim 5 in which the amine thixotropic agent is an aromatic amine having a molecular weight of from about 100 to about 400.

7. The process of claim 5 in which a polyol having a functionality greater than 2 is included in the composition applied in a).

8. The process of claim 1 in which the composition applied in a) is made up of 1) diphenylmethane diisocyanate, or (ii) a modified diphenylmethane diisocyanate, or (iii) a prepolymer of diphenylmethane diisocyanate having an NCO content of from about 8 to about 17% or (iv) a mixture thereof;

2) at least one polyol having a functionality of at least about 2 and a molecular weight of from about 1,000 to about 6,500;

3) an amine thixotropic agent; and 4) a catalyst.

9. The process of claim 1 in which the composition introduced into the mold in b) forms a polyurethane foam having a density of from about 1.8 to about 4.5 pounds per cubic foot, a recovery of at least 60%, and a sag factor of at least 2.5.

10. The process of claim 1 in which the composition introduced into the mold in b) is made up of 1) a diisocyanate, a polyisocyanate, a modified diisocyanate or a mixture thereof, 2) at least one polyether polyol having a functionality greater than or equal to 2.0, 3) a blowing agent, and 4) a catalyst in which 1) and 2) are used in quantities such that the ratio of isocyanate groups to isocyanate-reactive groups is between about 0.8:1.0 and about 1.2:1.0.

11. The process of claim 10 in which the blowing agent 4) is water.

12. The process of claim 10 in which 1) and 2) are used in quantities such that the ratio of isocyanate groups to isocyanate-reactive groups is approximately 1.0:1.0.

13. The process of claim 1 in which the elastomer-forming composition applied in a) is applied by spraying.

14. The process of claim 1 in which the foam-forming composition introduced in b) is introduced by injecting it into the mold.

15. The process of claim 1 in which the mold used is a mold for a seat cushion or a cushion pad.

16. The process of claim 1 in which step c) is carried out prior to introduction of the foam forming mixture in accordance with b).

17. The process of claim 1 in which step c) is carried out after step b) has been begun but prior to completion of step d).

18. The process of claim 1 in which the foam-forming mixture introduced in b) forms a bonding layer with the elastomer.

19. The composite molded article which is the product of the process of claim 1.

20. The composite molded article which is the product of the process of claim 15.

* * * * *